（12） United States Patent
Jang et al.

(10) Patent No.: US 11,124,083 B2
(45) Date of Patent: Sep. 21, 2021

(54) PERIODIC SUPPLEMENTARY CHARGE METHOD FOR BATTERY OF VEHICLE

(71) Applicants: HYUNDAI MOTOR COMPANY, Seoul (KR); KIA MOTORS CORPORATION, Seoul (KR)

(72) Inventors: Young Jin Jang, Pohang-si (KR); Han Shin Youn, Seoul (KR); Ho Joong Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 192 days.

(21) Appl. No.: 16/456,444

(22) Filed: Jun. 28, 2019

(65) Prior Publication Data

US 2020/0180464 A1 Jun. 11, 2020

(30) Foreign Application Priority Data

Dec. 11, 2018 (KR) .......................... 10-2018-0158995

(51) Int. Cl.
*B60L 53/62* (2019.01)
*B60L 58/12* (2019.01)
*B60L 58/16* (2019.01)
*B60K 6/28* (2007.10)

(52) U.S. Cl.
CPC .............. *B60L 53/62* (2019.02); *B60L 58/12* (2019.02); *B60L 58/16* (2019.02); *B60K 6/28* (2013.01); *B60Y 2200/92* (2013.01); *B60Y 2300/91* (2013.01)

(58) Field of Classification Search
CPC .......... B60L 53/62; B60L 58/12; B60L 58/13; B60L 58/14; B60L 58/16; B60L 58/15; B60L 3/0046; B60L 2240/549; B60Y 2300/91; B60Y 2200/91; B60Y 2200/92; B60K 6/28; G01R 31/392; G01R 31/378; G01R 31/3855; B60W 20/13; B60W 2510/244; Y02T 90/12; Y02T 10/70; Y02T 10/7072
USPC ................................ 320/104, 132–133, 109
See application file for complete search history.

(56) References Cited

U.S. PATENT DOCUMENTS

2014/0203759 A1* 7/2014 Sugiyama ............... B60L 58/14
320/104

FOREIGN PATENT DOCUMENTS

KR 10-1628552 B1 6/2016

* cited by examiner

*Primary Examiner* — Paul Dinh

(57) ABSTRACT

A periodic supplementary charge method of an auxiliary battery of a vehicle may include: estimating, by a controller, an available capacity of the auxiliary battery; measuring, by the controller, dark currents of the auxiliary battery; determining, by the controller, a supplementary charging execution time based on the estimated available capacity of the auxiliary battery; determining, by the controller, a supplementary charging execution period based on the estimated available capacity and information about the measured dark currents; and supplementarily charging, by the controller, the auxiliary battery by providing a charging current to the auxiliary battery based on the determined supplementary charging execution time and the determined supplementary charging execution period.

7 Claims, 2 Drawing Sheets

PERIODIC SUPPLEMENTARY CHARGE METHOD FOR BATTERY OF VEHICLE

CROSS REFERENCE TO RELATED APPLICATION

Figure 1:
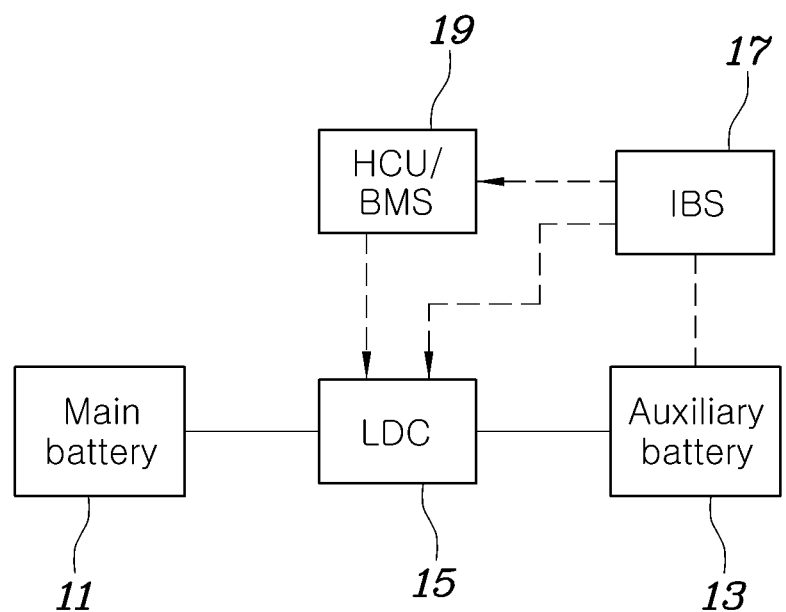

The present application claims priority to and the benefit of Korean Patent Application No. 10-2018-0158995, filed Dec. 11, 2018, the entire contents of which are incorporated herein by reference.

FIELD

The present disclosure generally relates to a periodic supplementary charge method of a vehicle battery.

BACKGROUND

The statements in this section merely provide background information related to the present disclosure and may not constitute prior art.

Generally, an environmentally-friendly vehicle such as an electric vehicle, a hybrid vehicle, a plug-in hybrid vehicle, or a fuel cell vehicle is a vehicle generating a driving force by generating a rotational force of a wheel by using an electric motor. The environmentally-friendly vehicle includes: a high voltage main battery that stores an electric energy provided to the electric motor providing the rotational force to a wheel; and a low voltage auxiliary battery that provides electric power to such an electric field load of a vehicle as a headlight or a wiper.

Particularly, in the environmentally-friendly vehicle, the auxiliary battery includes a low voltage DC-DC converter (LDC) between the main battery and the auxiliary battery so as to secure a starting performance of a vehicle and durability of the auxiliary battery, and the LDC forcibly lowers the voltage of the main battery and allows a lowered voltage thereof to be applied to the auxiliary battery so as to charge the auxiliary battery. Particularly, when a state in which starting of a vehicle is off or a state in which a vehicle stops is maintained for a predetermined hour or more, the LDC is driven so as to provide electric power of the main battery to the auxiliary battery such that the auxiliary battery is charged. Charging the auxiliary battery in such a manner is referred to as a supplementary charging.

In the related art, a preset charging period is set and whenever a charging cycle starts according to the period, a controller drives the LDC so as to charge the auxiliary battery during the preset period, or the controller drives the LDC for a predetermined time while reading a state of charge (SOC) of the auxiliary battery or a voltage value thereof so as to charge the auxiliary battery by using a low voltage, thereby maintaining the SOC of the auxiliary battery to be a preset reference SOC or more.

However, we have discovered that as degradation of the auxiliary battery proceeds, an auxiliary battery capacity decreases, and as electronic equipment receiving electric power from the auxiliary battery ages, dark currents of the auxiliary battery increase. We have also found that when the supplementary charge is performed in consideration of only the SOC of the auxiliary battery, a sufficient charge amount capable of efficiently maintaining a vehicle performance is not obtained.

The foregoing is intended merely to aid in the understanding of the background of the present disclosure, and is not intended to mean that the present disclosure falls within the purview of the related art that is already known to those skilled in the art.

SUMMARY

The present disclosure proposes a periodic supplementary charge method of a vehicle battery, wherein a state of health of an auxiliary battery is estimated, an entire capacity of the auxiliary battery is predicted, and a supplementary charging execution period and supplementary charging execution time are changeably determined on the basis of a predicted capacity of the auxiliary battery and dark currents occurring in the auxiliary battery, whereby a charge amount of the auxiliary battery may efficiently be obtained.

In one aspect of the present disclosure, a periodic supplementary charge method for an auxiliary battery of a vehicle may include: estimating, by a controller, an available capacity of the auxiliary battery; measuring, by the controller, dark currents of the auxiliary battery; determining, by the controller, a supplementary charging execution time based on the estimated available capacity of the auxiliary battery; determining, by the controller, a supplementary charging execution period based on the estimated available capacity and information about the measured dark currents of the auxiliary battery; and supplementarily charging, by the controller, the auxiliary battery by providing a charging current to the auxiliary battery according to the determined supplementary charging execution time and the determined supplementary charging execution period.

In one form of the present disclosure, in estimating the available capacity of the auxiliary battery, the available capacity may be determined based on a state of charge of the auxiliary battery or a voltage thereof when an immediately previous supplementary charging cycle according to a state of health of the auxiliary battery and the supplementary charging execution period stops.

In another form of the present disclosure, in estimating the available capacity of the auxiliary battery, a degradation capacity of the auxiliary battery may be calculated by applying the state of health to an initial capacity of the auxiliary battery before degradation of the auxiliary battery, and the available capacity may be determined by applying a preset correction value to the degradation capacity when the state of charge or the voltage of the auxiliary battery is smaller than a preset reference value when the immediately previous supplementary charging cycle according to the supplementary charging execution period stops.

In one form of the present disclosure, in measuring the dark currents of the auxiliary battery, the dark currents of the auxiliary battery may be measured so as to calculate an average value thereof, and when a state of charge or a voltage of the auxiliary battery measured immediately before the supplementary charging is smaller than a preset reference value, the information about the dark currents may be calculated by applying a preset correction value to the average value.

In other form of the present disclosure, in determining the supplementary charging execution time, the supplementary charging execution time may be determined by using a two-dimensional data map that pre-stores the supplementary charging execution time according to the available capacity.

In another form of the present disclosure, in determining the supplementary charging execution period, the supplementary charging execution period may be determined by using a three-dimensional data map that pre-stores the supplementary charging execution period according to the available capacity and the information about the dark currents.

The method, as another form, may further include: determining, by the controller, whether the auxiliary battery is normal based on a state of health of the auxiliary battery before estimating the available capacity of the auxiliary battery.

In other form of the present disclosure, in determining of whether the auxiliary battery is normal, the state of health may be calculated based on a supplementary charge number of the auxiliary battery or an internal resistance of the auxiliary battery, and when the state of health is smaller than a preset reference value, it may be determined that the auxiliary battery is abnormal.

According to the periodic supplementary charge method of a vehicle battery, it is checked whether the auxiliary battery is sufficiently charged by using the state of charge or the voltage of the auxiliary battery after a supplementary charge stops in every supplementary charging cycle, and when it is determined that the auxiliary battery is not charged up to at least a predetermined level, an estimated auxiliary battery capacity is corrected so as to increase the supplementary charging execution time, whereby a charge amount of the auxiliary battery is further increased in the subsequent supplementary charging cycle so as to sufficiently perform the supplementary charge.

In addition, according to the periodic supplementary charge method of a vehicle battery, an average value of dark currents of the auxiliary battery measured on the basis of the state of charge or the voltage of the auxiliary battery immediately before a supplementary charge in every supplementary charging cycle is corrected, whereby a supplementary charging execution period of the auxiliary battery may be set so as to properly compensate for a charge amount reduction of the auxiliary battery due to actual dark currents produced in the auxiliary battery.

Accordingly, according to the periodic supplementary charge method of a vehicle battery, the auxiliary battery of a vehicle may maintain a sufficient charge amount thereof, thereby improving a starting performance of a vehicle and increasing fuel efficiency of a vehicle.

Effects obtained from the present disclosure are not limited to effects described above, and other effects not described above will be clearly appreciated from the following description by those who are ordinarily skilled in the art.

Further areas of applicability will become apparent from the description provided herein. It should be understood that the description and specific examples are intended for purposes of illustration only and are not intended to limit the scope of the present disclosure.

DRAWINGS

Figure 2:
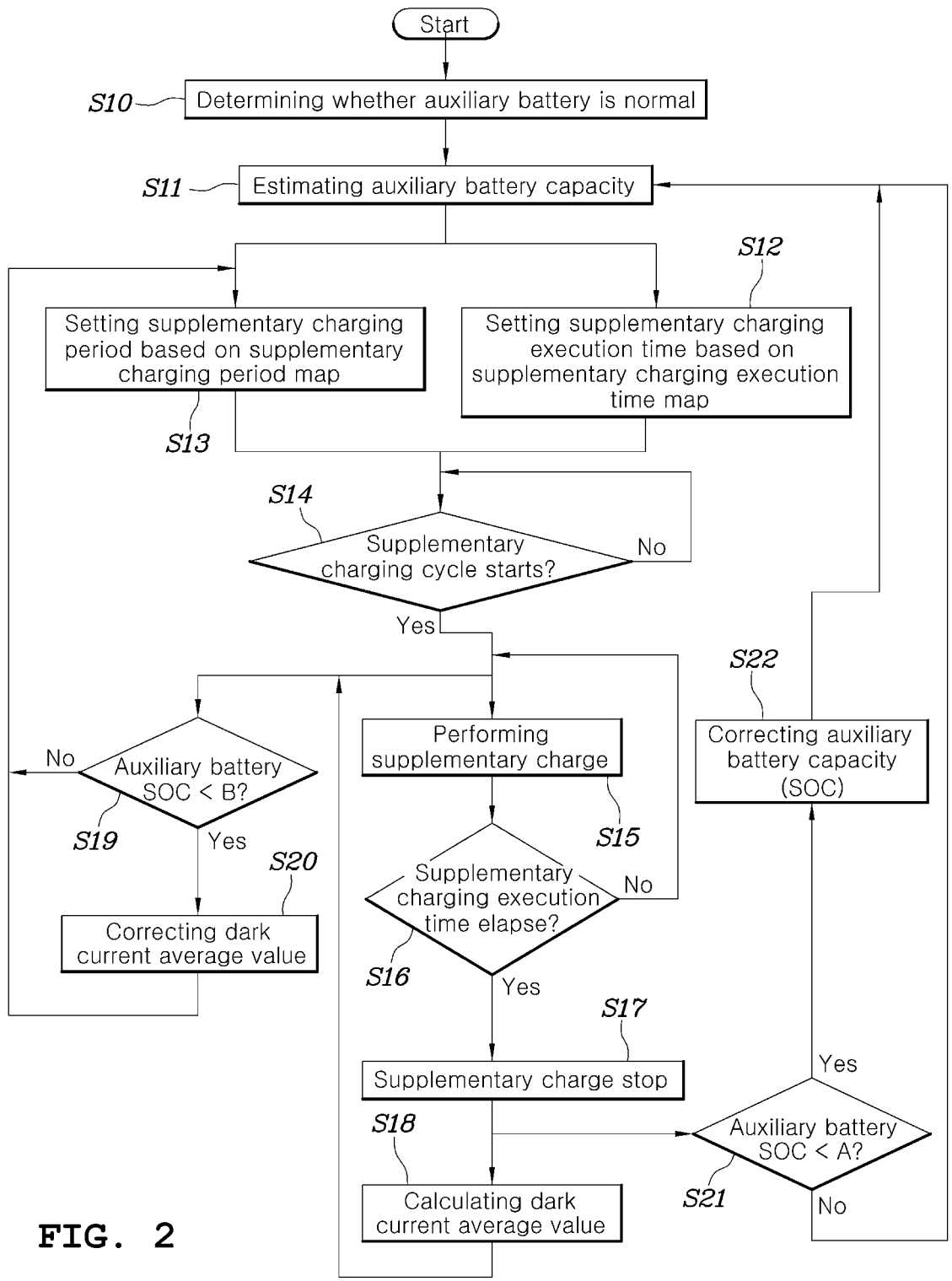

In order that the disclosure may be well understood, there will now be described various forms thereof, given by way of example, reference being made to the accompanying drawings, in which:

FIG. 1 is a block diagram of a system applying a periodic supplementary charge method of a vehicle battery; and FIG. 2 is a flowchart showing the periodic supplementary charge method of a vehicle battery.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, a periodic supplementary charge method of a vehicle battery according to an exemplary form of the present disclosure will be described in detail with reference to the accompanying drawings.

FIG. 1 is a block diagram of a system applying a periodic supplementary charge method of a vehicle battery according to one form of the present disclosure.

Referring to FIG. 1, a system to perform the periodic supplementary charge method may include: a main battery 11, an auxiliary battery 13 having a voltage smaller than a voltage of the main battery 11, and a low voltage DC-DC converter (LDC) 15 forcibly providing the voltage of the main battery 11 to the auxiliary battery 13.

In addition, the system carrying out the periodic supplementary charge method may include: an intelligent battery sensor (IBS) 17, which detects electric currents output from the auxiliary battery 13 and calculates an average value thereof when a supplementary charge is not performed, that is, when a vehicle stops an operation thereof or comes to a standstill; and a hybrid control unit (HCU) or a battery management system (BMS) 19, which determines a supplementary charging execution period and operates the LDC 15 according to the supplementary charging execution period.

The HCU or the BMS 19 functions as a controller executing a control algorithm so as to realize the periodic supplementary charge method of a vehicle battery according to the form of the present disclosure. For example, the supplementary charging execution period of the auxiliary battery 13 is set; supplementary charging execution time thereof is set; and a state of charge (SOC), a voltage, and a state of health (SOH) of the auxiliary battery 13 are calculated and accordingly, an on/off and control of the LDC 15 may be performed according to the set supplementary charging execution period and time.

Although the HCU or the BMS 19, which is a component already used in a hybrid vehicle technology, has a different algorithm executed therein according to manufacturer and vehicle, the HCU or the BMS should be appreciated to be a controller. Also, the terms, such as 'unit', 'controller', or 'module', etc., should be understood as a unit that processes at least one function or operation and that may be embodied in a hardware manner (e.g., a processor), a software manner, or a combination of the hardware manner and the software manner.

In addition, the HCU or the BMS 19 may include a memory that stores a processor performing calculation for realizing an algorithm and the algorithm, or various information desired during the realization of the algorithm. Particularly, the HCU or the BMS 19 may include a supplementary charging period map determining the supplementary charging execution period and a supplementary charging execution time map determining the supplementary charging execution time.

FIG. 2 is a flowchart showing the periodic supplementary charge method of a vehicle battery according to one form of the present disclosure.

Referring to FIG. 2, the periodic supplementary charge method of a vehicle battery may first perform determining whether the auxiliary battery 13 is normal at S10.

Determining whether the auxiliary battery 13 is normal at S10 is a step of determining whether the auxiliary battery 13 may work normally by determining the SOH of the auxiliary battery 13. The step S11 may be performed when the supplementary charge is not performed. Here, the SOH of a battery refers to a percentage of an available capacity of the battery except for a capacity reduction thereof compared to an initial capacity thereof in consideration of battery capacity reduction according to degradation of the battery.

More particularly, when it is determined whether the auxiliary battery 13 is normal at S10, the HCU or the BMS 19 (hereinbelow, referred to as a controller) stores a charge/discharge number of the auxiliary battery in consideration that degradation of the auxiliary battery 13 increases as the charge/discharge number of the auxiliary battery 13 increases. After that, the controller may estimate the SOH of the auxiliary battery. In addition, when it is determined whether the auxiliary battery 13 is normal at S10, the controller 19 may estimate the SOH of the auxiliary battery by measuring an internal resistance value of the auxiliary battery 13 in consideration that the internal resistance value of the auxiliary battery 13 increases as the auxiliary battery 13 degrades. Since various methods of measuring the internal resistance value of a battery are known to those skilled in the art to which the present disclosure belongs, an additional description will be omitted.

In addition, since various methods of measuring the SOH of a battery are also known by those skilled in the art, different methods except for the method of measuring the charge/discharge number or the internal resistance value of the battery, which is described above, in measuring the SOH of the battery performed at S10 may be applied.

Furthermore, to determine whether the auxiliary battery 13 may be used additionally at S10 when a measured SOH of the auxiliary battery 13 is smaller than a preset predetermined reference value, the controller 19 may check whether a charging current is provided to the auxiliary battery 13 after repeating charging/discharging for a predetermined time. This is intended to determine a state of the auxiliary battery 13 by providing the charging current after activating a chemical reaction in the auxiliary battery 13 by repeating the charging/discharging since the charging current may not be produced due to the characteristic of a lead-acid battery when the auxiliary battery 13 is the lead-acid battery. When the charging current is not provided to the auxiliary battery 13, that is, when the charged current of the auxiliary battery 13 is smaller than a preset reference value, it is determined that the auxiliary battery 13 is degraded not to be used any longer, and the controller may induce the auxiliary battery 13 to be exchanged by outputting a warning message.

When it is determined that the auxiliary battery 13 is normal at S10, the controller 19 may estimate a capacity of the auxiliary battery 13. As described above, since the SOH is the percentage of the available capacity of a battery compared to the initial capacity of the battery, a capacity equivalent to the SOH of the initial capacity of the auxiliary battery 13 may be estimated to be the capacity of the auxiliary battery 13 at S11. Meanwhile, when capacity correction of the auxiliary battery 13 is determined to be desired at S21 after executing the supplementary charge of the auxiliary battery 13, the controller 19 may estimate a corrected available capacity of the auxiliary battery by applying a correction value to the capacity of the auxiliary battery, which is estimated at S11, at S22.

Next, the controller 19 determines the supplementary charging execution time at S12. The controller 19 may determine the supplementary charging execution time based on the available capacity of the auxiliary battery 13 estimated at S11. As the supplementary charging execution time of the auxiliary battery 13 increases, the charge amount increases. Accordingly, as the available capacity of the auxiliary battery 13 decreases, the supplementary charging execution time may be determined to decrease at S12.

Particularly, the controller 19 may determine the supplementary charging execution time by using the supplementary charging execution time map, which is pre-stored, at S12. That is, the controller 19 draws in advance a relationship between the available capacity of the auxiliary battery 13 and the supplementary charging execution time via a prior experimental method and stores the relationship in a two-dimensional data map of the controller 19. When S12 is performed, the controller 19 searches the supplementary charging execution time for the available capacity of the auxiliary battery 13 from the two-dimensional data map and may determine the supplementary charging execution time.

In cooperation with S12, the controller 19 may determine the supplementary charging execution period on the basis of the available capacity of the auxiliary battery 13 and measured information about dark currents of the auxiliary battery 13 at S13. The dark currents of the auxiliary battery 13 refer to micro electric currents flowing out of the auxiliary battery 13 in a condition in which a vehicle does not operate. As the dark currents increase, frequent charging of the auxiliary battery 13 is desired. In addition, as the available capacity of the auxiliary battery 13 decreases, the SOC of the auxiliary battery 13 degrades rapidly, so that further frequent charging of the auxiliary battery 13 is desired.

At S13, the controller 19 may determine the supplementary charging execution period by which the supplementary charge of the auxiliary battery 13 is performed in consideration of the dark currents and the available capacity of the auxiliary battery 13.

In a method similar to a method in which the controller 19 determines the supplementary charging execution time at S12, to determine the supplementary charging execution period at S13, the controller 19 draws in advance a relationship between the available capacity, the dark currents of the auxiliary battery 13, and the supplementary charging execution period via a prior experimental method, and the relationship is stored in a three-dimensional data map of the controller 19. When S13 is performed, the controller 19 may determine the supplementary charging execution period by searching the supplementary charging execution period based on the available capacity of the auxiliary battery 13 and the information about the dark currents stored in the three-dimensional data map.

Meanwhile, the information about the dark currents input for setting the supplementary charging execution period at S13 may be the average value of the dark currents of the auxiliary battery 13 calculated by the IBS 17 connected to the auxiliary battery 13. At a state in which outputting of the LDC 15 does not occur, the IBS 17 measures the dark currents output from the auxiliary battery 13 and may calculate the average value at S18. As shown in FIG. 2, since the dark currents in relation to the supplementary charge may be measured after the supplementary charge stops, calculation of the average value at S18 after the supplementary charge stops is performed. However, the present disclosure is not limited thereto and in every occasion in which the dark currents of the auxiliary battery 13 may be measured, the IBS 17 may measure the dark currents and calculate the average value.

When a supplementary charging cycle according to the supplementary charging execution period determined at S13 starts at S14, the controller 19 operates the LDC 15 for the supplementary charging execution time determined at S12 so as to provide the charging current to the auxiliary battery 13, whereby the supplementary charging cycle may be performed. During the supplementary charge at S15, the LDC 15 may be controlled such that a preset predetermined charging current is provided to the auxiliary battery 13.

When the supplementary charging cycle starts at S14 immediately before the supplementary charge is performed at S15, the controller 19 may check the SOC of the auxiliary battery 13 at S19. Checking the SOC of the auxiliary battery 13 performed at S19 is to determine whether the SOC is excessively degraded by the dark currents while the supplementary charge is not performed between a series of supplementary charging cycles of the auxiliary battery 13. For example, when the SOC of the auxiliary battery 13 is smaller than a preset reference value B immediately before the supplementary charge, the condition of the auxiliary battery is excessively discharged, and accordingly, more frequent charging is desired. Accordingly, when the SOC of the auxiliary battery 13 is smaller than the preset reference value B at S19, a preset average correction value of the dark currents is applied to the determining of the supplementary charging execution period at S13 of the subsequent supplementary charging cycle so as to further increase the average value of the dark currents calculated at S18. Accordingly, at S13 of the subsequent supplementary charging cycle, the controller 19 determines the supplementary charging execution period by using an average value of the dark currents corrected to have a larger value, whereby the supplementary charging execution period is further decreased and further frequent supplementary charge may be performed.

When the supplementary charging execution time determined at S12 elapses at S16 after starting the supplementary charge, the supplementary charge stops at S17. Immediately after the supplementary charge stops, the controller 19 compares the SOC of the auxiliary battery with another reference value A, which is preset, at S21. This is intended to determine whether the supplementary charge of the auxiliary battery 13 is sufficiently performed by execution of the supplementary charging cycle at S21. When the SOC of the auxiliary battery 13 is smaller than a preset reference value A at S21, it is determined that the supplementary charging execution time to sufficiently charge the available capacity of the auxiliary battery 13 is not obtained. Accordingly, the estimated value of the available capacity of the auxiliary battery 13 may be corrected so as to increase the available capacity of the auxiliary battery 13 up to the preset reference value at S22. That is, when an application of a preset correction value is determined so as to correct the estimated capacity of the auxiliary battery at S22, the capacity of the auxiliary battery is estimated by applying the correction value to the capacity of the auxiliary battery when the capacity of the auxiliary battery is estimated according to the supplementary charging execution period at S11 in the subsequent supplementary charging cycle. When the estimated value of the available capacity of the auxiliary battery increases at the subsequent cycle, the supplementary charging execution time may be set to be even longer at S12.

Meanwhile, instead of comparing the SOC of the auxiliary battery 13 with reference values at S19 and S21 described above, the voltage of the auxiliary battery 13 may be compared with the reference values. Generally, as for the SOC and the voltage of the auxiliary battery 13, as the SOC increases, the voltage of the auxiliary battery also increases. Accordingly, to omit an additional calculation process for drawing the SOC, an indirect determination of the SOC may be performed by comparing the voltage of the auxiliary battery with the reference values at S19 and S21.

As described above, the periodic supplementary charge method of a vehicle battery according to the form of the present disclosure may constantly feedback an optimum supplementary charging execution time and supplementary charging execution period every supplementary charging cycle, thereby enabling supplementary charging control capable of increasing fuel efficiency of a vehicle and securing robustness thereof.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A periodic supplementary charge method of a vehicle battery, the method comprising:
   estimating, by a controller, an available capacity of an auxiliary battery;
   measuring, by the controller, dark currents of the auxiliary battery;
   determining, by the controller, a supplementary charging execution time based on the estimated available capacity of the auxiliary battery;
   determining, by the controller, a supplementary charging execution period based on the estimated available capacity and information about the measured dark currents of the auxiliary battery; and
   supplementarily charging, by the controller, the auxiliary battery by providing a charging current to the auxiliary battery based on the determined supplementary charging execution time and the determined supplementary charging execution period,
   wherein in measuring the dark currents,
      the dark currents of the auxiliary battery are measured so as to calculate an average value thereof, and when a state of charge or a voltage of the auxiliary battery measured immediately before the supplementary charging is smaller than a preset reference value, the information about the dark currents is calculated by applying a preset correction value to the average value.

2. The method of claim 1, wherein in estimating the available capacity, the available capacity is determined based on a state of charge of the auxiliary battery or a voltage thereof when an immediately previous supplementary charging cycle based on a state of health of the auxiliary battery and the supplementary charging execution period stops.

3. The method of claim 2, wherein in estimating the available capacity, a degradation capacity of the auxiliary battery is calculated by applying the state of health to an initial capacity of the auxiliary battery before degradation of the auxiliary battery, and the available capacity is determined by applying a preset correction value to the degradation capacity when the state of charge or the voltage of the auxiliary battery is smaller than a preset reference value when the immediately previous supplementary charging cycle based on the supplementary charging execution period stops.

4. The method of claim 1, wherein in determining the supplementary charging execution period, the supplementary charging execution time is determined by using a two-dimensional data map that pre-stores the supplementary charging execution time based on the available capacity.

5. The method of claim 1, wherein in determining the supplementary charging execution period, the supplementary charging execution period is determined by using a three-dimensional data map that pre-stores the supplementary charging execution period based on the available capacity and the information about the dark currents.

6. The method of claim 1, further comprising:
determining, by the controller, whether the auxiliary battery is normal based on a state of health of the auxiliary battery before estimating the available capacity of the auxiliary battery.

7. The method of claim 6, wherein in determining whether the auxiliary battery is normal, the state of health is calculated based on a supplementary charge number of the auxiliary battery or an internal resistance of the auxiliary battery, and when the state of health is smaller than a preset reference value, it is determined that the auxiliary battery is abnormal.

* * * * *